United States Patent [19]

Baron

[11] Patent Number: 4,954,209

[45] Date of Patent: Sep. 4, 1990

[54] APPARATUS FOR PRODUCING MOLDED ARTICLES

[75] Inventor: Robert M. Baron, Los Angeles, Calif.

[73] Assignee: Lockheed Corporation, Calabasas, Calif.

[21] Appl. No.: 282,521

[22] Filed: Dec. 12, 1988

[51] Int. Cl.⁵ .............................................. B30B 5/02
[52] U.S. Cl. .................................. 156/583.1; 249/65; 249/153; 249/179; 425/405.1; 425/417
[58] Field of Search ............... 100/269 A; 156/245, 156/285, 583.1; 249/60, 65, 78, 153, 179, 184; 425/405.1, 405.2, 417, 470

[56] References Cited

U.S. PATENT DOCUMENTS

| | | | |
|---|---|---|---|
| 2,407,528 | 9/1946 | Antonson | 156/285 |
| 2,435,866 | 2/1948 | Bilhuber | 144/281 |
| 3,158,089 | 9/1961 | Fillol | 100/244 |
| 3,184,528 | 5/1965 | Norwalk | 425/405.2 |
| 3,962,393 | 6/1976 | Blad | 264/90 |
| 3,962,394 | 6/1976 | Hall | 156/285 |
| 3,969,051 | 7/1976 | Hovila | 425/405.1 |
| 4,126,659 | 11/1978 | Blad | 264/90 |
| 4,174,241 | 11/1979 | Rockar et al. | 156/285 |
| 4,352,707 | 10/1982 | Wengler et al. | 156/285 |
| 4,370,120 | 1/1983 | Foster | 425/405 |
| 4,565,595 | 1/1986 | Whitener | 156/245 |
| 4,692,362 | 9/1987 | Johnson | 156/245 |
| 4,806,195 | 2/1989 | Namysl | 100/269 A |

Primary Examiner—Jay H. Woo
Assistant Examiner—C. Scott Bushey
Attorney, Agent, or Firm—Louis L. Dachs

[57] ABSTRACT

The invention is an apparatus for molding an article made of layed up materials having opposed principle surfaces, such as one that is hollow tubular shaped. In detail, the invention includes a first mold part for forming one surface of the article on which the layup is placed and a second mold part for forming the opposite surface. Additionally included are rubber layers placed on both surfaces of the layup which expand when heated compacting the layup. A containment structure is mounted about the first and second mold parts and is in moveable relationship to the first and second mold parts. First and second inflatable bags are mounted between the containment structure and the first and second mold parts for balancing the loads on the mold parts while the silicon rubber layers compact the layup.

11 Claims, 5 Drawing Sheets

APPARATUS FOR PRODUCING MOLDED ARTICLES

TECHNICAL FIELD

The invention relates to the field of apparatus for molding structures made from material such as composites and, in particular, to molding apparatus for extremely large structures wherein conventional molding machines would be prohibitively expensive and/or difficult to handle.

BACKGROUND INFORMATION

Modern composite materials such as graphite fibers in an epoxy resin matrix, when properly formed, can provide lightweight, high strength and high modulus structures and have a great number of applications. For example, engine nacelles and wings of aircraft and, in fact, entire airframes are now being manufactured using such materials. Thermosetting resins, such as the epoxies, require heating in order to cure and harden. Because such materials are provided in the form of tape or sheet in an uncured state, most structures are formed from multiple layers of this material, often with the fibers in each layer orientated at different angles in order to enhance structural properties. This requires that pressure also be applied during the curing to provide compaction thereof. Typically, flat composite structures can be formed in matched molds or dies; however, a more common approach is to layup the uncured sheets in a mold, vacuum bag, pull a vacuum between the vacuum bag and the mold and thereafter heat and allow atmospheric pressure to compact the layup. If more than atmospheric pressure is required the vacuum bagged layup can be placed in autoclave. In some applications the need for the autoclave can be eliminated by placing the vacuum bagged layup and mold in a housing and use an inflated bag to apply pressure, the limitation being the strength of the bag wall. An example of this technique can be found in U.S. Pat. No. 2,435,866 "Fluid-Operated Apparatus for Producing Molded Articles" by P.H. Bilhuber. However, if the part is large, the mold must be extremely ridged in order to prevent distortion thereto. Thus, mold fabrication costs rise along with the size of the mold and great difficulty is encountered when handling. Another approach is place expandable silicon rubber sheets on one or both sides of the layup. Here the rubber expands upon heating to forming temperatures and supplies the compaction pressure. However, the compaction pressures must be reacted against the molds which also leads to the need for heavy and expensive molds if the parts are large.

In the fabrication of hollow (closed sectioned) composite parts there are primarily two methods used, both based on the above processes for flat type parts. In one method the part is layed up over a rigid mandrel, vacuum bagged and placed in an autoclave. However, if the part is 15 or 20 feet in diameter a very large autoclave is required. Thus, in many instances compaction pressure on the layup is limited to atmospheric and the part must be cured in an oven. Also, the mandrel must be extremely rigid (and heavy) in order to absorb the large compression loads without excessive distortion. The forming pressure can be increased by surrounding the layup with pressurizable bags retained within a housing. However, the addition of the housing makes such tooling even more difficult to handle and costly to manufacture. The same problem occurs if the layup were formed against an external mold.

A specific example can be found in U.S. Pat. No. 4,126,659 "Method of Making a Hollow Article" by L. H. Blad. In this reference a silicon bag in the shape of the inner surface of the structure to be formed is filled with a low melting temperature alloy and allowed to solidify. The part is layed up on the now rigid mandrel with a thin impermeable film therebetween. An external mold is placed about the layup and the film is sealed thereto and a vacuum is drawn. Next the mandrel is heated melting the alloy which is thereafter poured out of the silicon bag. The mandrel is then pressurized and the assembly is heated to form the layup against the external mold. It is obvious that this method would be extremely difficult to use in the manufacture of large diameter parts, especially, when one contemplates filling a 15' diameter bag with the low temperature melting point alloy.

Another approach is found in U.S. Pat. No. 3,962,393 "Method for Making a Hollow Laminated Article" also by L.H. Blad. Here a hollow, flexible envelope is rigidized by means of a solid support mandrel installed therein. As in the prior example, an impermeable film is positioned between the mandrel and the support. A split external mold is placed around the assembly and the film is sealed thereto. A vacuum is pulled and the solid support is removed. The assembly is then placed in an autoclave and heated under pressure compressing the layup against the external mold. The problem here is the difficulty that would be encountered in removing a 15' diameter solid support. Additionally, in such a system, the external mold must be extremely rigid to hold shape. Other patents of interest are U.S. Pat. No. 4,370,120 "Compacting Press with Expandable Body" by D. Foster which uses an expandable circular shaped bag to mold material about a mandrel.

Also of interest is the system disclosed in the U.S. Pat. No. 3,158,089 "Device for Pressing Gruyere Cheeses" by R. Fillol. While this invention relates to an entirely different subject, the molding of cheese, it is of interest because of the duel pressurized bag concept. In this system the cheese is placed in a housing between moveable flat molds. Flexible bags mounted behind each mold are pressurized forcing the molds into the cheese. However, this system could not be used to manufacture composite structural parts because of its inability to hold precise dimensions.

Therefore, it a primary object of the subject invention to provide an apparatus for forming large closed sectioned molded articles made of composite materials and the like.

It is another object of the subject invention to provide an apparatus for making large molded articles without the need for an autoclave while using forming pressures above atmospheric.

It is a further object of the subject invention to provide an apparatus for forming large molded articles using relatively inexpensive tooling and molds.

It is a still further object of the subject invention to provide an apparatus for forming large molded articles which is light in weight.

DISCLOSURE OF THE INVENTION

The manufacture of large, closed sectioned circular shaped molded articles which range in diameters of up to 15 to 20 feet are difficult or impossible to form in one piece using conventional forming techniques. Thus, initially and for purposes of illustration, an embodiment of the apparatus is discussed which is suitable for forming large circular shaped hollow parts such as large propeller or fan duct liner for ducted fan type propulsion systems used on ocean going hovercraft.

With the instant apparatus it is possible to build such a part in one piece by molding using multiple layers of composite material. A typical composite material would be graphite filamentary reenforced epoxy resin.

The apparatus includes a circular inner cylindrical support preferably made of a light metal such as an aluminum alloy. Placed about the inner support are a plurality of inner airbags having inlet tubes and which combined form a continuous ring about the inner cylinder. Mounted about the inner airbags is a continuous ring of insulation. Over the inner ring of insulation is an inner circular shaped mold having a surface conforming to the inner surface of the part to be formed. The inner mold further includes integral end plates. Preferably, the inner mold is made of material having a coefficient of expansion similar to that used to form the part. The layup typically would comprise sheets of uncured graphite/epoxy material with the orientation of the filamentary material dictated by the design loads on the part. Placed about the layup is an outer mold composed of a plurality of ceramic bricks machined to the external contour of the part. These outer bricks preferably have a generally similar coefficient of expansion as the layup. The use of segmented outer bricks is generally necessary so that the outer mold can be assembled about a layup having a complex shape; however, if the outer contour of the layup is simple then a one-piece outer mold can sometimes be used. Around the outer mold is an outer ring of insulation. Mounted about the outer ring of insulation are a plurality of second or outer cylindrical airbags. Again, these bags together form a continuous ring. Surrounding the outer airbags is an outer support.

Between the inner mold and the layup is a layer of silicon rubber, having printed circuit heaters thereon sandwiched between additional layers of silicon rubber. Placed on the outside of the layup are a plurality of segmented silicon rubber sheets formed to the other contour of the part which, may also incorporate printed circuit heaters. The layers of silicon rubber expand when heated and apply compaction pressure as well as isolate the layup from the inner and outer molds during the cure cycle. The outer mold can also incorporate printed circuit heaters thereon to add additional heat to the silicon rubber.

In operation the airbags once inflated support and isolate the inner and outer molds while reacting the compaction forces generated by the expanding layers of silicon rubber and the loads therefrom are reacted against the "floating" inner and outer cylindrical supports. Since the inner and outer supports only provide surfaces for the reactent loads, they do not have to remain dimensionally stable to produce an accurate part.

Without departing from the spirit of the overall concept, modifications to the apparatus can make it suitable for molding non-circular shaped parts. Here the apparatus would comprise a fixed lower mold attached to end plates for receiving the layup with a second floating mold thereover. Also included are upper and lower inflatable bags mounted between the molds and contained in place by an outer floating retainer.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

Illustrated in FIG. 1, is a perspective view of a hollow molded part made of composite materials that the subject invention is ideally suited to make.

Illustrated in FIG. 2 is a partial cross-sectional view of a portion of the part illustrated in FIG. 1, taken along the line 2—2 showing an integral reenforcement on the part.

Illustrated in FIG. 3 is a perspective view of the assembled apparatus suitable for molding the part shown in FIGS. 1 and 2 connected to a pressurizing, electrical power and control systems.

Illustrated in FIG. 4 is an exploded perspective view of the apparatus in a configuration suitable for forming the part illustrated in FIGS. 1 and 2.

Illustrated in FIG. 5 is a partial perspective cross-sectional view of FIG. 3 taken along the line 5—5.

Illustrated in FIG. 6 is a cross-sectional view similar to FIG. 5.

Illustrated in FIG. 7 is an enlarged view of a portion of FIG. 5, particularly illustrating the layup of the part prior to molding.

Illustrated in FIG. 8 is an alternate configuration of the apparatus adapted for making non-hollow parts.

BEST MODE FOR CARRYING OUT THE INVENTION

The apparatus is primarily suited for the manufacture of large, closed sectional, circular shaped molded articles; however, it can be used for forming parts of almost any shape. Thus, initially, and for purposes of illustration, an embodiment of the apparatus is illustrated suitable for forming closed sectioned circular shaped parts such as large hollow propeller or fan duct liners for ducted fan-type propulsion systems used on ocean going hovercraft. Such ducts can range in diameters up to 15 to 20 feet making such parts difficult or impossible to form in one piece using conventional forming techniques.

Figure 1:
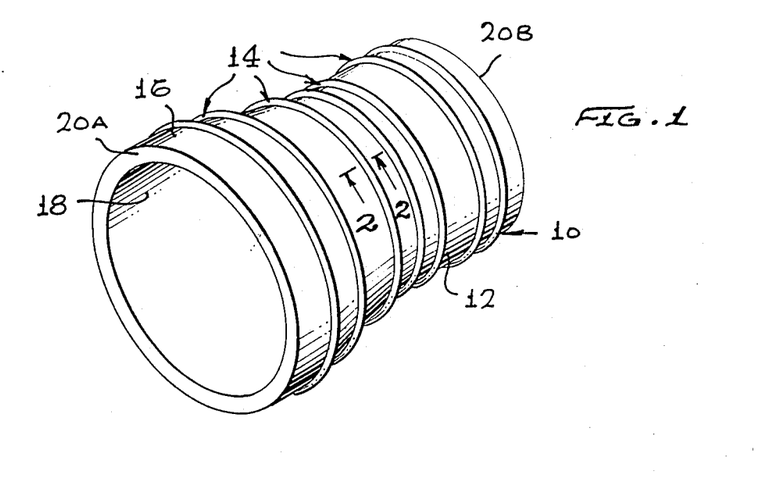
Figure 2:
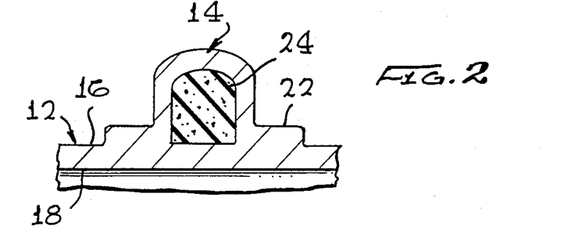

Thus, illustrated in FIG. 1 is a perspective view of a duct liner for a propeller shroud, generally indicated by numeral 10, while illustrated in FIG. 2 is a partial cross-sectional view of a portion of FIG. 1 taken along the line 2—2. The duct liner 10 includes a duct wall 12 having external reinforcements 14 on its outer surface 16 and a smooth inner surface 18. The duct 10 tapers in cross section from its first end 20A to its second end 20B. The reinforcements 14 comprise a cover 22 having a foam core 24. In order to save weight and provide stiffness such ducts are often made of composite materials having filamentary reinforcements in a resin matrix. In the past, such a large duct liner would be fabricated in several sections and thereafter joined together. However, with the instant apparatus it is possible to build such a part in one piece by molding using multiple layers of composite material. A typical composite material would be graphite filamentary reenforced epoxy resin (hereafter abbreviated to graphite/epoxy composites).

Figure 3:
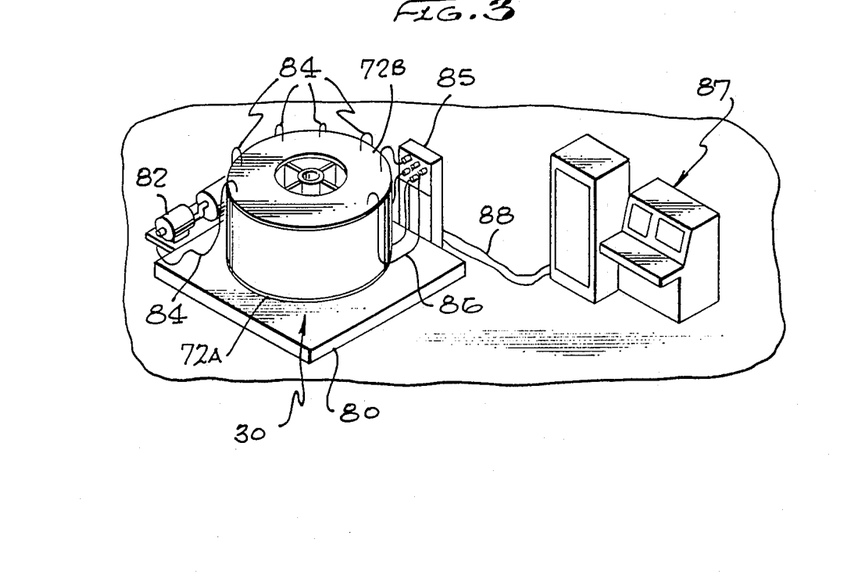
Figure 4:
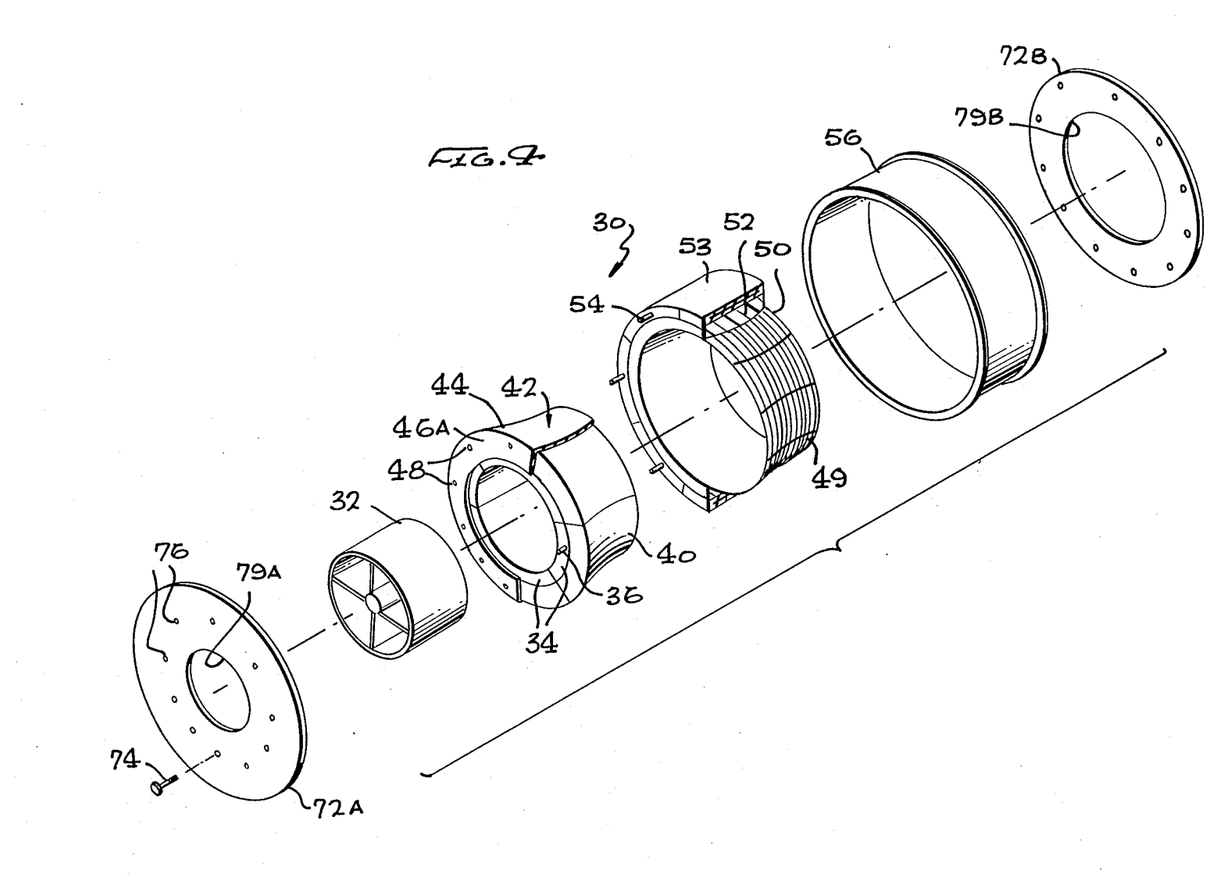
Figure 5:
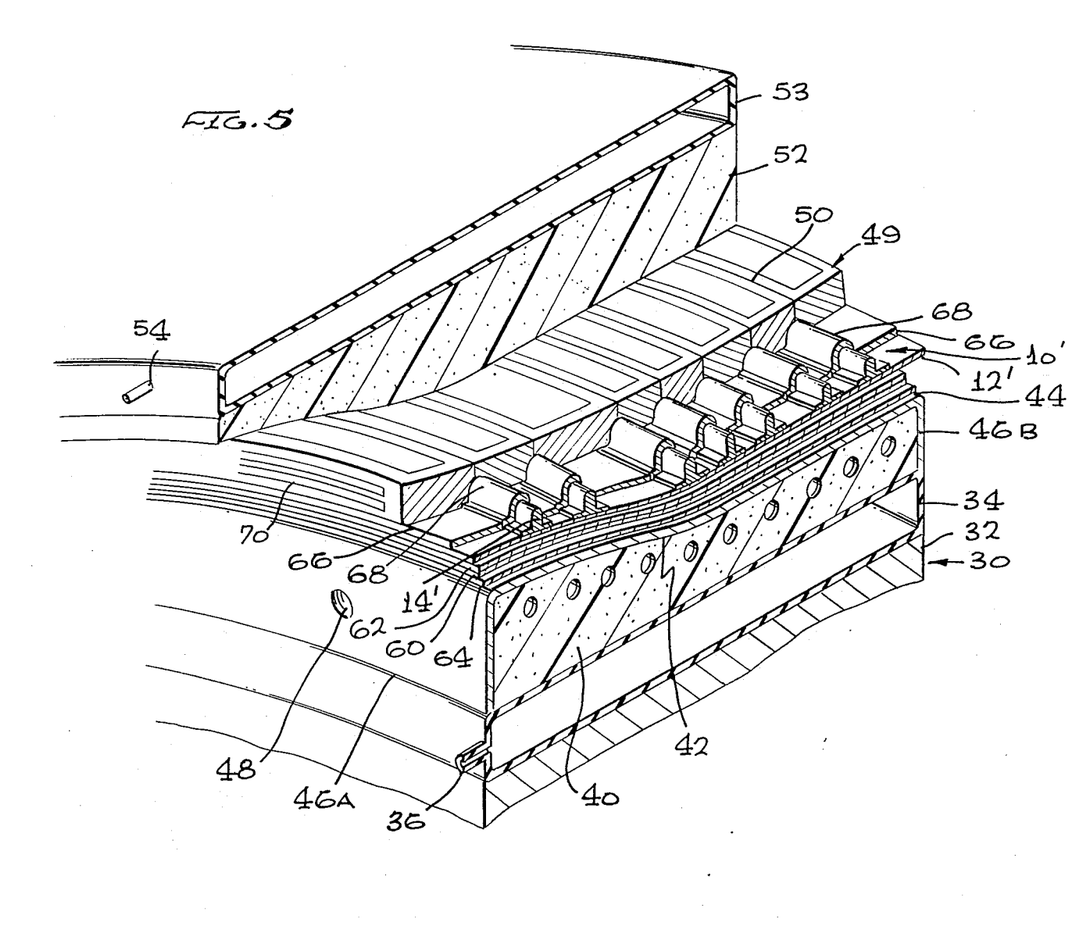
Figure 6:
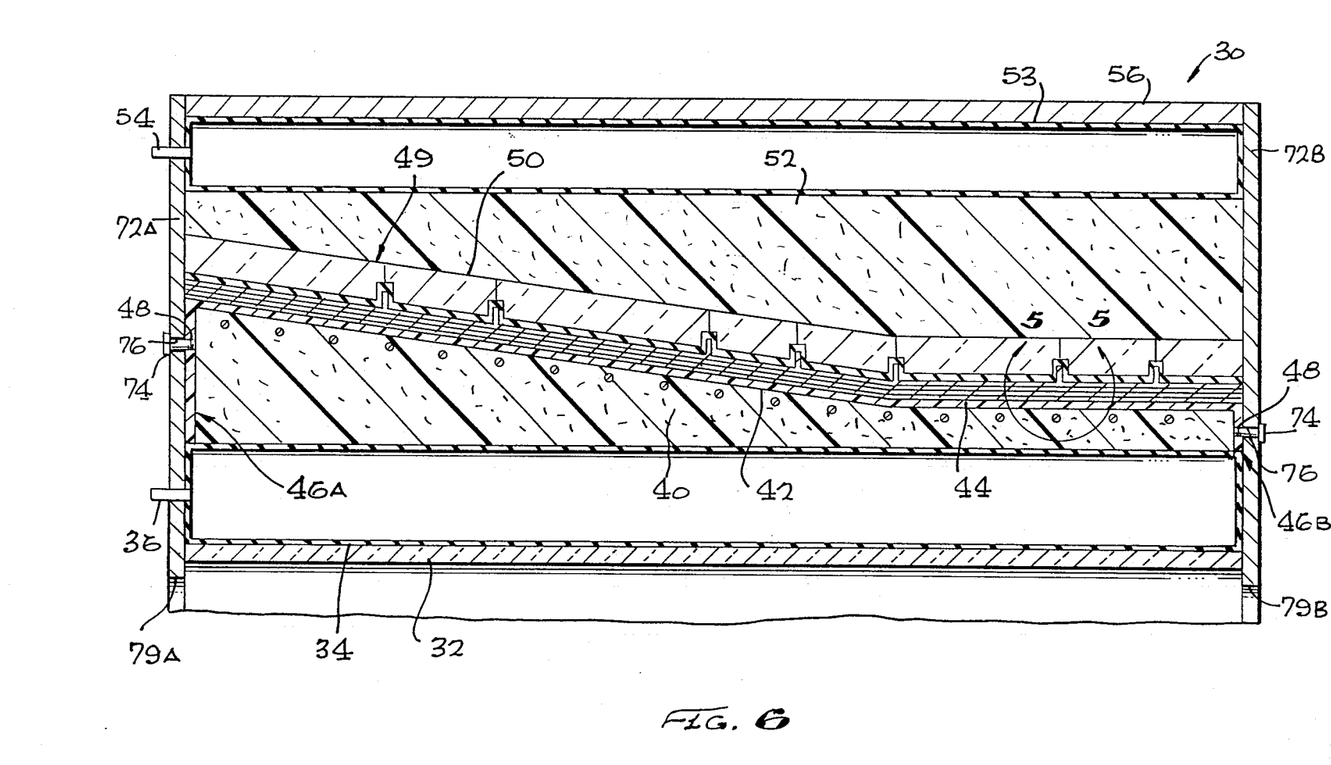
Figure 7:
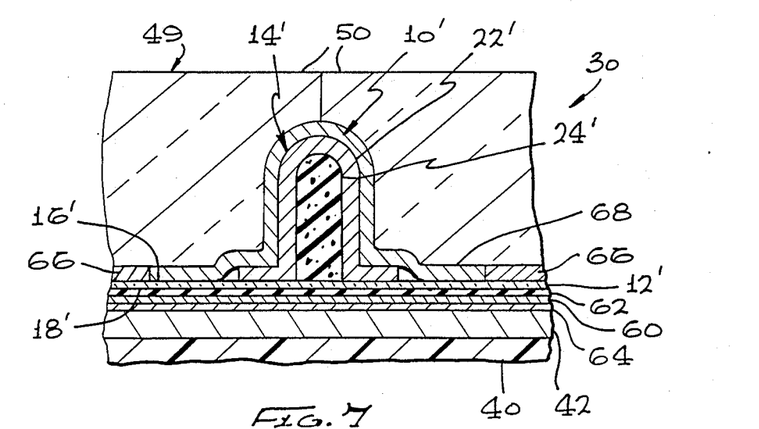

Illustrated in FIG. 3 is a perspective view of the assembled apparatus, generally indicated by numeral 30, shown in a vertical position along with the associated control equipment, while illustrated in FIG. 4 is an exploded perspective view of the apparatus. To further illustrate the apparatus, provided in FIG. 5 is a partial perspective cross-sectional view of FIG. 3 taken along the line 5—5, while illustrated in FIGS. 6 is an enlarged cross-sectional view a portion of FIG. 3 also taken along the lines 5—5, and finally, in FIG. 7 is an enlarged view of a portion of FIG. 5 particularly illustrating the layup of the part prior to molding. Referring to FIGS. 3–7 it can be seen that the apparatus 30 includes a circular inner cylindrical support 32, preferably made of a light metal such as an aluminum alloy. Placed about the support 32 are a plurality of airbags 34 having inlet lines 36 which are preferably, made of silicon rubber. The bags 34, when combined, form a continuous expandable ring about the support 32. Mounted within the bags 34 is a continuous insulation ring 40, preferably made of a foam material having the strength necessary to absorb the loads induced by the bags 34 when pressurized. Within the insulation ring 40 is an inner circular shaped mold 42 having a surface 44 conforming to the inner surface 18 of the duct liner 10 (FIG. 1). The mold 42 further includes integral flanges 46A and 46B having threaded fastener holes 48 therein. Preferably, the mold 42 is made of a material having a coefficient of expansion similar to that used to form the duct liner which, for example a graphite/epoxy composite material. However, the epoxy resin used must have an operational temperature above the curing temperature of the resin used in the duct liner. Note that the insulation ring 40, if made of foam could be "foamed in place" to the mold 42. Particularly referring to FIGS. 7 it can be seen that the layup of the duct liner, generally indicated by numeral 10', typically, would comprise a wall 12' made of sheets of graphite/epoxy material with the orientation of the filamentary material dictated by the design loads on the duct. The reenforcement 14' would comprise a cover 22' made of layers of identical material and the foam 24' would be suitable for the loads and temperatures of curing.

Placed about the layup 10' is an outer mold 49 formed of a plurality of ceramic bricks 50 machined or molded to the external contour of the duct 10. The use of segmented bricks 50 is necessary so that the outer mold 49 can be assembled about the layup 10', particularly about the reinforcements 14'. Note that if the duct had no such reinforcements and at least a slight taper from one end to the other a continuous one-piece outer mold could be installed over the layup. The ceramic bricks 50 are preferably made of a material having a generally similar coefficient of expansion as the duct layup. In this example, a suitable insulation material is Thermal Sil 120 manufactured by Thermo Materials Corporation, Scottsdale, Ga., or Marenite, manufactured by the Manville Corporation, Denver, Colo. These materials have a thermal expansion which generally matches those of the graphite/epoxy materials used in the layup 10'. An outer ring 52 of insulation is located about the mold 49, preferably made of foam. Around the outer ring 52 of insulation are a plurality of second airbags 53 having inlet lines 54 also made of silicon rubber. Again, these bags 53 together form a continuous ring about the ring 52 of insulation. Surrounding the airbags 53 is an outer retaining cylindrical support 56, preferably made of Kevlar/epoxy, a lightweight material having high tension load capability.

Particularly referring to FIGS. 5–7, between the inner mold 42 and the layup 10' are a layer 60 of silicon rubber having printed circuit heaters (not shown) thereon, sandwiched between silicon rubber layers 62 and 64. Silicon rubber is preferred for the layers 60, 62 and 64 as well as the bags 34 and 53. The layers of silicon rubber 62 and 64 isolate the printed circuit heaters from the layup 10' and the layup from the mold 42 during curing. Placed on the opposite side of the layup 10' is a plurality of segmented silicon rubber layers 66 and 68. Layers 66 are flat calendared silicon rubber, while the layers 68 are preferably extruded silicon rubber in the shape of the reenforcement 14. Additionally, the bricks 50 can incorporate printed circuit heaters thereon, indicated by numeral 70, also the rubber layer 66 and 68 can incorporate such heaters. The silicon rubber layers 60, 62, 64, 66 and 68 upon heating to the curing temperatures of the layup expand and apply the necessary compaction pressure to the layup.

Finally, end plates 72A and 72B are joined to the inner mold flanges 46A and 46B, respectively by means of fasteners 74, which extend through holes 76 in the end plates and engage the threaded holes 48 in the flanges. The end plate 72A also incorporate holes 77 for the inlet lines 36 and 54 of the bags 34 and 53, respectively and large central apertures 79A and 79B, respectively.

Of course it is possible to vacuum bag the layup, for example, by placing a thin layer of flexible material, such as Mylar about the outer mold 48 and sealing it to mold 42 and pulling a vacuum thereon. However, in most applications vacuum bagging would not be necessary.

Particularly referring to FIG. 3, the assembled apparatus 30 is shown installed on a stand 80 with associated operating equipment including a pressurizing pump assembly 82 having pneumatic lines 84 connected to inlet lines 36 and 54 of the bags 34 and 53, respectively, and electrical power supply 85 connected to the printed circuit heaters by means of electrical lines 86 and, finally, a process controller 87 for monitoring and controlling the cure cycle (i.e. electrically connected by lines 88 to thermal couples (not shown)). These components are all well within the state of the art and, thus, need not be further discussed.

Referring to FIGS. 3–7 the sequence of assembly and disassembly of the apparatus is as follows:

(1) Attach end plates 72A and 72B to the inner mold 42 by means of fasteners 74.

(2) Place the silicon rubber layer 64 onto the inner mold 42.

(3) Place silicon rubber layer 60 with the printed circuit heated heaters thereon on layer 64.

(4) Place second silicon rubber layer 62 on top of layer 64.

(5) Assemble layup 10' over layer 62; either hand layup or automated techniques can be used.

(6) Place silicon rubber layers 66 and 68 over the layup 10'. Note, as well known to those knowlegdable in the field of composite fabrication, that peal plys, breather cloth (to provide an escape path for the gases generated during curing) and release coatings are used as required and thus, have not been discussed further.

(7) Assemble the outer mold 49 using the segmented bricks 50.

(8) Route electrical lines 86 (best seen in FIG. 3) and thermal couple wires 88 to thermal couples (not shown). These are needed to monitor the cure cycle.

(9) Place inner and outer support cylinders 32 and 56 in place.

(10) Place inner and outer rings 40 and 52 of insulation in place.

(11) Place bags 34 and 53 in place.

(12) Connect pneumatic lines 84 to lines 36 and 54 from pump 82.

(13) Cure part by applying heat by means of power supply 85 and control cure cycle by controller 87. As previously stated, the silicon rubber layers 60, 62, 64, 66 and 68 expand when heated and apply pressure to compact the layup 10'. The inflated airbags support the inner and outer molds while reacting the compaction forces generated by the silicon rubber layers and the loads therefrom are reacted by the inner and outer cylindrical supports.

(14) Allow apparatus 30 to cool down.

(15) Deflate airbags 34 and 53.

(16) Remove inner and outer cylinders 32 and 56.

(17) Remove bags 34 and 53.

(18) Remove inner and outer rings of insulation 40 and 52.

(19) Remove outer mold 49.

(20) Remove silicon rubber layers 66 and 68.

(21) Remove inner mold 42 and layers 60, 62 and 64 from cured duct liner 10.

Figure 8:
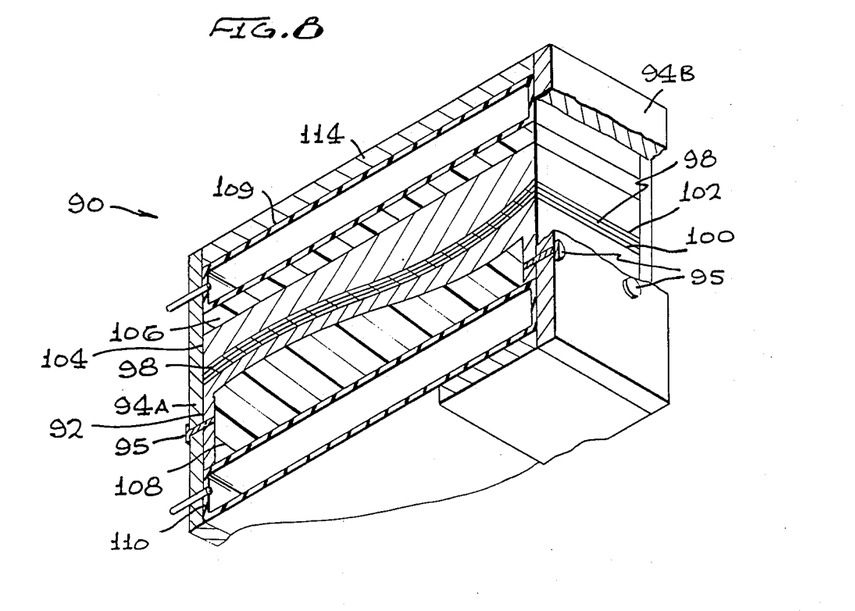

Illustrated in FIG. 8 is a modified version of the apparatus, indicated by numeral 90, suitable for molding non-circular shaped parts. Here the apparatus 90 comprises a fixed mold 92 attached to end plates 94A and 94B by fasteners 95 with the layup 98 thereon. The silicon rubber layer with printed circuit heaters (not shown) therein sandwiched between additional layers of silicon rubber are all indicated as a single layer 100, while a layer of silicon rubber 102 is located on the opposite side of the layup 98. A second floating mold 104 is placed thereover. Also included are upper and lower insulation layers 106 and 108, respectively, and upper and lower inflatable bags 109 and 110, respectively, mounted between the insulation layers 108 and 110 and an outer floating retainer 114. The details of the invention are similar to the embodiment illustrated in FIGS. 3-7. Note, that in this embodiment the floating mold 104 and insulation layer 106 need not be segmented.

It is readily apparent that all the objects of the invention are met for it is certainly applicable to the manufacture of large, closed sectioned (hollow), molded articles and, in particular, those made from composite materials, without the need for an autoclave. The tooling, for its size, is relatively inexpensive in that the inner and outer molds can be made of graphite/epoxy composites. This is possible because the loads on the inner mold are balanced by use of the dual bags. Additionally, the outer support cylinder only needs to absorb loads in hoop tension and so it can also be made of composite materials. The inner cylindrical support only sees compression loads and, thus can be of simple construction and both can distort under load without effecting the dimensional accuracy of the part. Certainly the "floating" design allows the use of very lightweight materials.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims. Industrial Applicability The invention has applicability to the field of manufacturing and, in particular to the manufacture of large molded structures which will not fit into autoclaves.

I claim:

1. An apparatus for molding a part for having two opposed principle surfaces and made from layed-up molded materials, the apparatus comprising:

a support;

containment means moveable in relationship to said support;

a first mold part having a surface for forming one of the principle surfaces of the lay up, said first mold part attached to said support and mounted within said containment means;

a second mold part having a surface for forming the opposed principle surface of the lay up, said second mold part mounted within said containment means and movable in relationship to said first mold part;

at least one layer of expandable material mounted on each of said surface of said first and second mold parts, said layers of material expandable upon the application of heat thereto;

first and second inflatable container means made of a flexible material mounted between said containment means and said first and second mold parts for supporting said first and second mold parts, respectively;

means to heat said layers of expandable material and to raise the temperature of the lay up therebetween to forming temperatures; and means to pressurize said first and second container means;

such that during the molding process said first mold part is held stationary and said expandable layers of material expand and compact the lay up and said container means supports the first and second mold parts and the reaction forces are absorbed by the containment means.

2. The apparatus as set forth in claim 1, wherein the part is of a closed sectioned hollow shape and the one principle surface is the interior surface of the part and the opposite principle surface is the exterior surface and said apparatus further comprising:

said first mold part for forming the interior surface;

said second mold part for forming the exterior surface;

said containment means comprising an inner support member and an outer support member; and said first inflatable container means is mounted between said first mold part and said inner support member and said second inflatable container means is mounted between said second mold part and said outer support member.

3. The apparatus as set forth in claim 2, wherein said layers of expandable material are made of silicon rubber.

4. The apparatus as set forth in claim 3, wherein said second mold part is segmented.

5. The apparatus as set forth in claim 4, wherein said first and second container means comprise a plurality of inflatable bags forming continuous rings about said first and second mold parts, respectively.

6. The apparatus as set forth in claim 1, wherein said layers of expandable material are made of silicon rubber.

7. The apparatus as set forth in claim 5 or 6, wherein said first and second mold parts have coefficients of expansion generally equal to the layup.

8. The apparatus as set forth in claim 7, wherein said first and second container means are made of silicon rubber.

9. The apparatus as set forth in claim 8, wherein said first mold part is made of a material generally similar to the layup.

10. The apparatus as set forth in claim 9, wherein there are inner and outer layers of insulation between said inner inflatable container means and said first mold part and said outer inflatable container means and said second mold part, respectively.

11. The apparatus as set forth in claim 10, wherein said heating means includes printed circuit heaters.

* * * * *